A. H. HOMRIGHAUS.
ARC WELDER.
APPLICATION FILED FEB. 26, 1915.
1,238,406.
Patented Aug. 28, 1917.
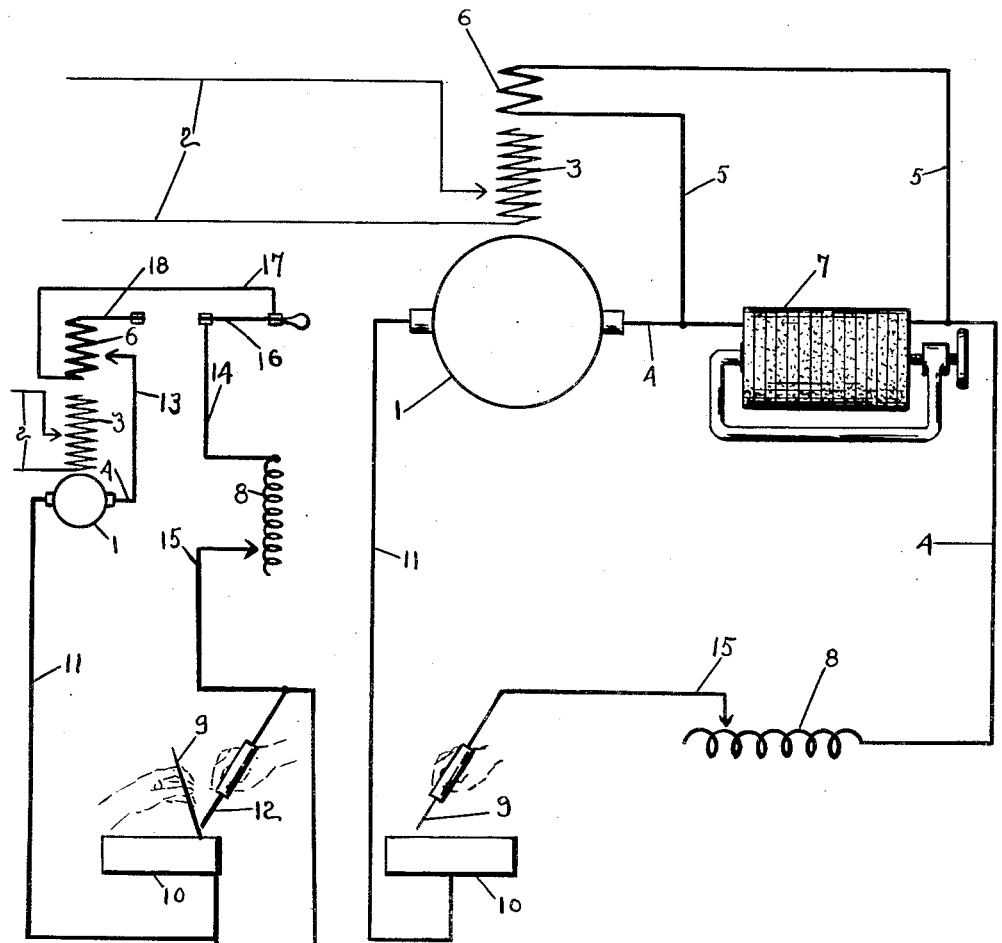
FIG.1
FIG.2
Witnesses
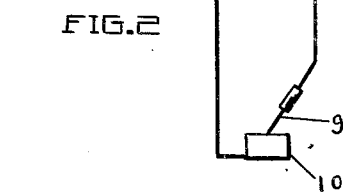
Albert H Homrighaus
Inventor
By Geo E Kirk
Attorney

UNITED STATES PATENT OFFICE.

ALBERT H. HOMRIGHAUS, OF DETROIT, MICHIGAN, ASSIGNOR TO THE LINCOLN ELECTRIC COMPANY, OF CLEVELAND, OHIO, A CORPORATION OF OHIO.

ARC-WELDER.

1,238,406.  Specification of Letters Patent.  Patented Aug. 28, 1917.

Application filed February 26, 1915. Serial No. 10,669.

*To all whom it may concern:*

Be it known that I, ALBERT H. HOMRIGHAUS, of Detroit, Wayne county, Michigan, a citizen of the United States of America, have invented new and useful Arc-Welders, of which the following is a specification.

This invention relates to mechanism for economically controlling power consumption in the use of electric current.

This invention has utility in contributing to the simplicity and efficiency of power consumption and electric current control, as in arc circuits for various purposes, say for projecting apparatus or welders of the direct current type.

Referring to the drawings:

Figure 1 is a wiring diagram of an embodiment of the invention in a direct current electric welding apparatus creating the welding heat by the break in the circuit forming an arc; and Fig. 2 is another wiring diagram of the invention.

The direct current generator 1 may have the independent exciting circuit 2 for the normal exciting field 3, which field is shown as adjustable. The lead line 4, say from the positive side of the generator 1, to advantage, may be provided with the shunt line 5 having therein the field winding 6 for the generator 1, opposing the field winding 3, and accordingly effective to lower the output of the generator at generation, and independently of rheostat or energy consuming grids or resistance in the circuit from the generator. The lead line 4 may have therein the variable resistance or compressible carbon disk pile 7. Compacting the disks by the manually adjustable screw reduces the resistance in the lead line 4, and accordingly reduces the current flow through the field winding 6, thereby providing a ready means for varying the action of the opposing or "bucking" field 6 on the normal exciting field 3.

The lead line 4 of the arcing circuit from the generator 1 has therein the inductance 8, which is shown as adjustable, and serves to check any tendency toward quick change in electric current to the element 9 which is being fused off as an electrode of metal upon the work 10 receiving the weld or being repaired. The arcing circuit from the resistance break or arc between the metal pencil 9 and the work 10 returns to the generator 1 by the ground or through the negative lead line 11.

The generator power consumption may be kept to a minimum by apparatus peculiarly designed for the special work in hand. But to vary the work and thus increase the flexibility of the apparatus of the disclosure, the separately excited field winding 3 may be adjusted. The opposing field 6 automatically varies its action as the current flow varies, and additional adjustment may be effected by the adjustable pile 7 (Fig. 1,) or connection 13 (Fig. 2). The conductor or lead lines 4 and 5 from the "bucking" field 6 extend to the reactance 8. This reactance 8 may be fixed for particular work, or may be adjusted to increase flexibility over a wide range of work by the adjustable connection 15.

The inductance and "bucking" field have special value in their coöperative relation in keeping down power consumption at the generator, while greatly contributing to efficiency in current control, in that a working arc may be quickly drawn, and readily maintained throughout the operation even with considerable degree of unsteadiness of the operator or variation in the length of arc. The determination of arc adjustment during operation by varying the strength of the opposing series or bucking field is especially desirable in that there is thus no occasion to disturb the previously set separately excited field. The disturbing of the separately excited field during operation may on occasion result in the series field overcoming the separately excited field with disastrous results in killing the source of current supply by demagnetizing the magnets.

In the manipulation of arcs, the manually adjustable arc to be drawn and maintained, taxes the most skilled operators, and this means current consumption and time lost, with the expense incident to each piling up. The inductive resistance in the arcing circuit permits of ready drawing of the arc by the operator bringing the electrodes close to each other and then moving them apart for the working arc length. In thus starting and manually adjusting the arc, the devices herein avoid sudden rushes of current. A rush of current in arc welding causes the fusing on of the electrode as to the work, such contact forming a conductor without arcing resistance, and so lowering the temperature. As a result of this cooling operation, the electrode is quickly frozen to the work, and time is consumed in releasing, while electric current is wasted, and many times the operation to be performed is farther from the end desired than initially. The choking action of the inductive resistance or reactance reduces, if not fully eliminates such welding troubles, and apart from arc welder use, assists in uniform arc maintenance, or in the combination of uniform current and uniform power consumption. Instead of the metal 9 being fused off at the arc as the electrode in the arcing circuit, the arcing circuit may be provided with the carbon electrode 12. The pencil 9 of metal to be fused off, may be held adjacent the arc from the carbon electrode 12, to be fused off by the heat upon the work 10 as desired.

The pile 7, or connection 13 may be adjusted so that there may be a supplemental control for increased accuracy over the adjustment of the independently excited field winding 3.

Any increase, or tendency to increase amperage flowing in the circuit 4, 11, may be fully or partially neutralized, automatically by the "bucking" field winding 6. As the load current increases, increased counteracting or opposing effectiveness is given the winding 6, thereby lowering the independent exciting field winding 3 in its magnetic circuit strength. The generator is thus operating to maintain the desired current even under varying demands, and the inductance retards the demands, if not actually smoothing them out.

In practice, it is desirable to have a generator run up to say 75 volts to break down the initial resistance in starting an arc, say for welding. With the arc started, a working voltage of 20 or 30 volts will suffice. With the brief period or instant for drawing the arc and the relatively much longer working period, there is a greatly unbalanced demand and if the voltage drop is procured by inserted resistance, there is energy loss running close to 75% during the major portion of operation, a loss which is avoided in the device herein disclosed.

The device is simple in its combination any may be conveniently designed and so used that there is entire absence of energy dissipating resistance, or a great lowering of above noted energy loss having no other work value. Each resistance herein, apart from the actual conductors as such, has a working value. The field currents produce the magnetic fluxes, and neutralize each other in the control. The arc produces the working heat. The reactance is normally negligible, but any quick change in current is smoothed out in the stabilizing action of this inductance.

When it is desired to operate more than one arc with the single generator, instead of the drooping characteristic produced from operation with the differential series field winding, it is desirable to reverse the current in this field for supplementing the high resistance field winding, making the machine then operate under constant voltage. This is effected by throwing the switch 16 to connect with the line 17, instead of the line 18. The reactance 8 chokes sudden current changes to steady the arc or arcs or working current flow.

What is claimed and it is desired to secure by Letters Patent is:

1. The combination with an arcing circuit, and a generator for supplying current thereto, of exciting means for said generator comprising a separately excited winding and an opposing winding in series with the arcing circuit, and means for adjusting the strength of the series winding whereby there may be adjustments for stable ranges of automatic regulation of the arcing circuit from a given no load voltage.

2. The combination with an arcing circuit, and a generator for supplying current thereto, of exciting means for said generator comprising a separately excited winding and an opposing winding in series with the arcing circuit, means for adjusting the strength of the series winding whereby there may be adjustments for stable ranges of automatic regulation of the arcing circuit from a given no load voltage, and additional means for adjusting the no load voltage.

3. The combination with an arcing circuit provided with an inductance therein, and a generator for supplying current to said circuit, of exciting means for said generator comprising a separately excited winding and an opposing winding in series with the arcing circuit, and means for adjusting the strength of the series winding whereby there may be adjustments for stable ranges of automatic regulation of the arcing circuit from a given no load voltage.

In testimony whereof I affix my signature in the presence of two witnesses.

ALBERT H. HOMRIGHAUS.

Witnesses:
Geo. E. Kirk,
J. W. Lincoln.